235-380
Y2587 OR 3,996,450
T235/380

United States Patent [19]

Kerkhoff

[11] 3,996,450

[45] Dec. 7, 1976

[54] SECRET NUMBER CHANGE ROUTINE

[75] Inventor: Diane P. Kerkhoff, Kettering, Ohio

[73] Assignee: NCR Corporation, Dayton, Ohio

[22] Filed: Mar. 31, 1975

[21] Appl. No.: 563,436

[52] U.S. Cl. ........................ 235/61.7 B; 340/149 A
[51] Int. Cl.[2] ........................................ G06K 7/08
[58] Field of Search ............... 235/61.7 B, 61.11 D, 235/61.12 M; 360/2; 340/149 A

[56] References Cited

UNITED STATES PATENTS

| | | | |
|---|---|---|---|
| 3,697,729 | 10/1972 | Edwards et al. | 235/61.7 B |
| 3,715,569 | 2/1973 | Hicks et al. | 235/61.7 B |
| 3,862,716 | 1/1975 | Black et al. | 235/61.7 B |
| 3,891,830 | 6/1975 | Goldman | 235/61.7 B |

OTHER PUBLICATIONS

Gaston, Prevention of Unauthorized Use of a Credit Card, IBM Technical Disclosure Bulletin, vol. 13, No. 7, Dec., 1970, pp. 1910–1911.

*Primary Examiner*—Stuart N. Hecker
*Attorney, Agent, or Firm*—J. T. Cavender; Albert L. Sessler, Jr.; Edward Dugas

[57] ABSTRACT

A method and apparatus for use with automatic dispensing type machines of the type which are activated by a customer's coded credit card. The method and apparatus are directed to the changing of an encoded access number, generally referred to as a secret number, which number is recorded on the customer's credit card and which number the customer has to remember in order to activate the machine. The secret number is changed at the customer's request to one that the customer selects for ease of remembering.

In order to initiate the change a supervisor control card is inserted into the dispensing machine and the coded message on the control card informs the machine that a change in the secret number of a customer's credit card is to be performed. The control card is removed and the customer's card is inserted. The customer card is checked for validity, and the customer's account is identified. A keyboard is activated with the new secret number which secret number is then encoded onto the customer's credit card. A code notation is stored in the machine with the customer's account number indicating that the secret number has been changed. The customer's credit card is then returned.

12 Claims, 9 Drawing Figures

SECRET NUMBER CHANGE ROUTINE

BACKGROUND OF THE INVENTION

The present invention relates to automatic dispensing machines of the type which are activated by encoded credit cards and more particularly to a method and apparatus for changing the secret number recorded on the encoded credit card.

Automatic dispensing machines, such as automated banking teller machines, have been developed which are capable of carrying on routine banking functions. Access to those machines is generally by way of a coded credit card that is under the control of the customer. Additional safety features are generally built into the machine such as requiring the customer to key into the system a secret number, which number is compared against the secret number recorded on the credit card. One of the main advantages associated with the use of an automated banking teller machine is the convenience afforded the customer in accessibility to the machine. This accessibility is greatly diminished if the customer cannot remember the secret number. The desired level of accessibility could be maintained if a number, which is familiar to the customer, could be used as the secret number. Generally assignment of the secret numbers is made on a random basis when the card is assigned to the customer. It would be highly desirable to be able to change the secret number to one that could be remembered by an individual customer, when, for example, the customer is having difficulty in remembering the assigned number.

SUMMARY OF THE INVENTION

In accordance with the present invention there is provided a method and apparatus for changing the secret number recorded on a customer's credit card to a number selected by the customer under the control of a supervisor card.

A magnetic card reader reads a coded message from a supervisor inserted control card. The control card informs the machine that a change in the secret number of a customer's credit card is to be performed. The control card is removed and the customer's credit card is inserted. The customer's credit card is checked for validity, the customer's account is identified and the old secret number is removed. A keyboard is activated with the new secret number which number is then encoded onto the customer's credit card. A code notation is stored in the machine with the customer's account number indicating that the secret number has been changed. The customer's credit card is then returned.

It is therefore an object of the present invention to provide a method of controllably changing selected coded portions of a credit card.

It is another object of the present invention to provide a method and apparatus for changing the coding of an access number recorded on a credit card.

It is a further object of the present invention to provide a method whereby the user of an encoded credit card may change a portion of the coded access number to a number of the user's choice.

These and other objects of the present invention will become more apparent and better understood when taken in conjunction with the following description and drawings, which drawings form a part of the present specification, and wherein like characters indicate like parts.

DESCRIPTION OF THE PREFERRED EMBODIMENT

Figure 1:
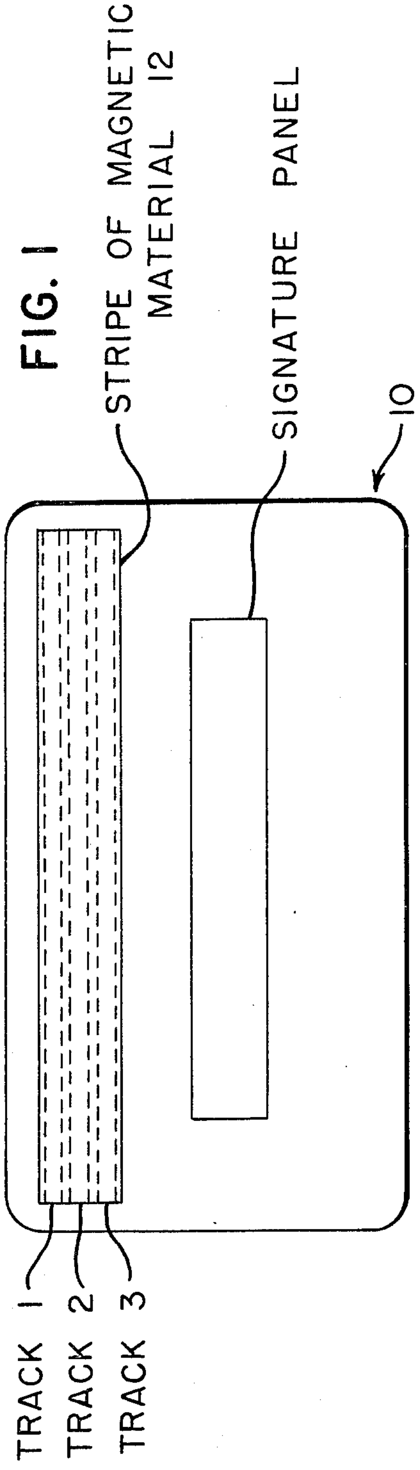
FIG. 1 is a back view of a typical customer credit card of the type having a stripe of magnetic material affixed thereto.

Referring to FIG. 1 there is shown a credit card 10 having at least one stripe of magnetic material 12 located thereon. The magnetic stripe may consist of one or more tracks of prerecorded information or data. Card 10 is particularly adapted to be used by a customer in an automatic teller type machine. The recorded information or data will therefore generally consist of the following: date of expiration, account number, date last used, bank number, and secret number. For purposes of this invention the secret number is of particular interest. When the customer is issued his credit card the secret number, generally a six digit number, assigned by the issuing agency has been recorded on the card. The customer is informed of the secret number and is told to remember it. When the customer presents his credit card to the teller machine the assigned secret number must be entered by the customer on a keyboard. If a predetermined relationship exists between the secret number read from the customer's credit card and the secret number entered by the customer then the teller machine accepts the customer as being the rightful owner of the credit card, or other credit medium.

Figure 2:
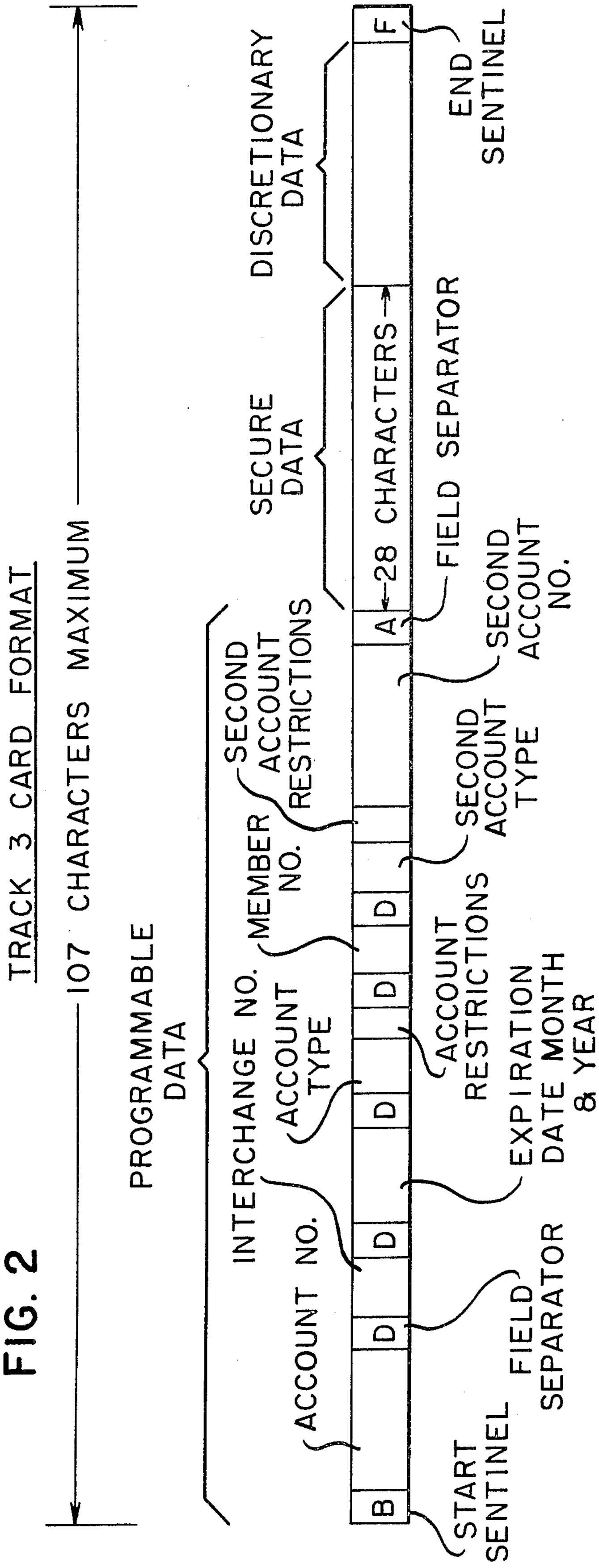
FIG. 2 is an enlarged view of one track of the magnetic stripe of FIG. 1 illustrating possible locations for character data.

In FIG. 2 a typical encoding format for the TRACK 3 of the magnetic stripe 12 is shown. A TRACK 3 type card may accept a maximum of 107 characters. The 107 characters are divided into three general groups: Programmable Data, Secure Data, and Discretionary Data. The START sentinel is labeled a B and the field separators are labeled D, except for the field separator A which separates the Programmable Data from the Secure Data. The END sentinel is labeled F. The Programmable Data appears on the card as clear test, that is, unscrambled. The first field, in the Programmable Data group, is the START sentinel B which sentinel initiates the card reader logic. The next field contains the customer's account number. Next is a field separator labeled D, which separates the account number field from the interchange number field. The interchange number allows the bank user to limit usage of a particular teller machine to those persons within their marketing region. Following this field is a field separator D which in turn is followed by the expiration date (month and year) field. Another field separator D follows and then the account type field. The account type field enables the customer to have several different accounts under one account number (e.g., checking account and savings account). The account type field is followed by an account restriction field, which field contains the restrictions for the kinds of transactions to be accomplished on the account. A field separator D follows and then a member number field. The member number field enables persons within the same family to have different cards but under the same account number. A field separator follows the member number field. The remaining fields in the Programmable Data group may be used to store second account information.

The Secure Data group is separated from the Programmable Data group by a field separator A. The Secure Data group consists of 28 characters, six of which are used to represent the secret number. The data within the Secure Data field is encoded (scrambled), using, for example, the encoding device and techniques disclosed in U.S. Pat. application Ser. No. 553,955, filed Feb. 28, 1975, entitled "A Programmable Cryptic Device For Enciphering And Deciphering Data," by H. S. Richard et al., which application is assigned to NCR Corporation, the assignee of the present application.

The present invention directs itself towards the changing of the six characters, recorded in the Secure Data field, that represent the secret number.

The remaining data group is the Discretionary Data group wherein the teller terminal owner may record data which is particular to his business system. The last field on the card is the END sentinel field F, which field notifies the card reader logic that no additional data appears on this particular track.

Figure 3:
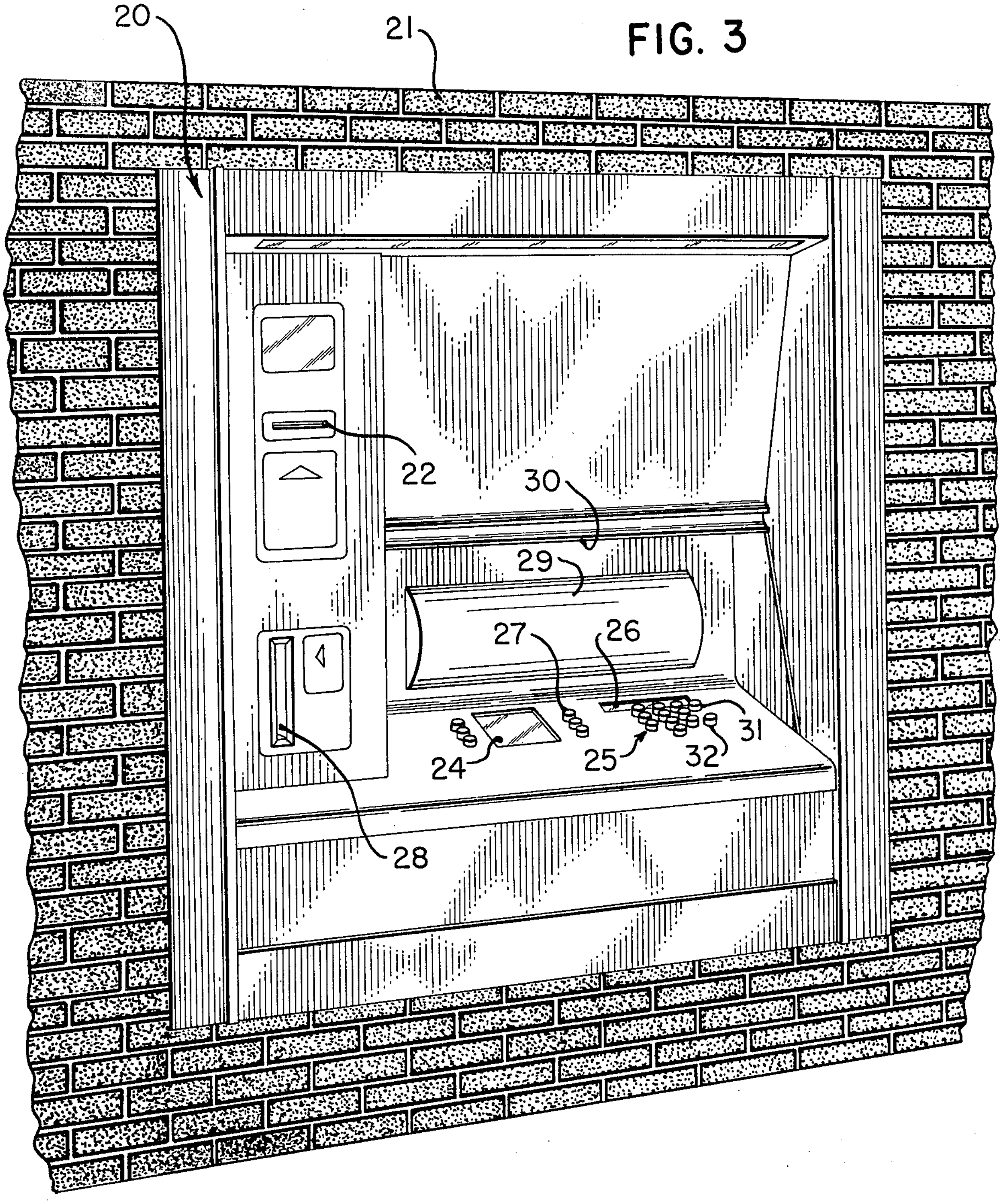
FIG. 3 is a pictorial view of a currency dispenser, of the type which is accessed by a credit card.

In FIG. 3 an automatic teller machine 20 is shown mounted in the wall 21 of a building, such as a bank building. The teller machine includes a card slot 22 wherein the cusotmer may insert his credit card. An envelope slot 28 is used by the customer to make deposits. Special envelopes are placed near the machine for the customer's use. A message display window 24 permits the customer to view one of the twelve following programmed messages so as to lead the customer through the desired transaction sequence:

Frame No. 0 - Panic Frame
Frame No. 1 - Power Up after Power Down (Banking card in terminal)
Frame No. 2 - Too Many Digits Entered
Frame No. 3 - Keyboard Entry Timeout
Frame No. 4 - Re-Enter Secret Number
Frame No. 5 - Insert Banking Card (Power Up)
Frame No. 6 - Secret Number Entry
Frame No. 7 - Transaction Selection
Frame No. 8 - Wait For Processing
Frame No. 9 - Remove Banking Card
Frame No. 10 - Remove Drawer Contents
Frame No. 11 - Insert Envelope.

Positioned on either side of the display window 24 are six function keys 27. The function keys are used by the customer to select particular machine transactions. A keyboard set of ten number keys 25, an ERROR key 31, and an ENTER key 32 are provided to permit the customer to enter his secret number and various transaction values. All machine entered key selections from the keyboard, except the secret number selection, are displayed for the customer by a character display 26. The secret number is normally displayed by means of a dash for each digit of the number in order to keep the number secret to the individual customer. The only exception to this is when the new secret number, which is replacing an old secret number, is being entered by the customer through the keyboard. In this one case the new secret number is displayed as it is keyed in by the customer. A revolving cash door 29, rotates open to allow the customer to receive the items being dispensed, for example, cash and a receipt. A vandel door 30 closes after a transaction is completed to protect the keyboard, displays, and cash door, from damage. The insertion of a valid credit card in slot 22 automatically opens the vandal door.

Figure 4:
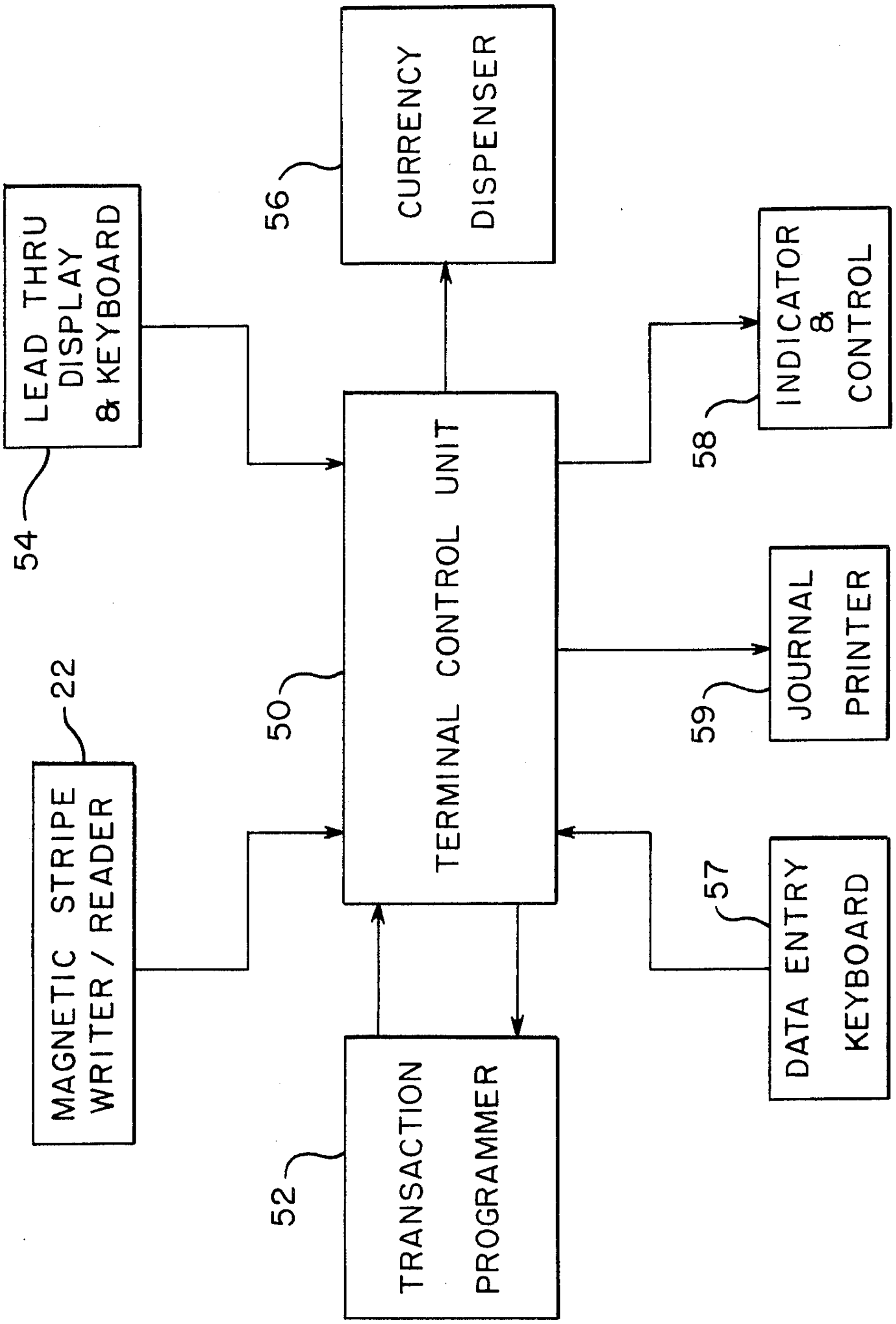
FIG. 4 is a block diagram of a means for implementing the method illustrated by the flow diagram of FIGS. 5A to 5E.
Figure 5A:
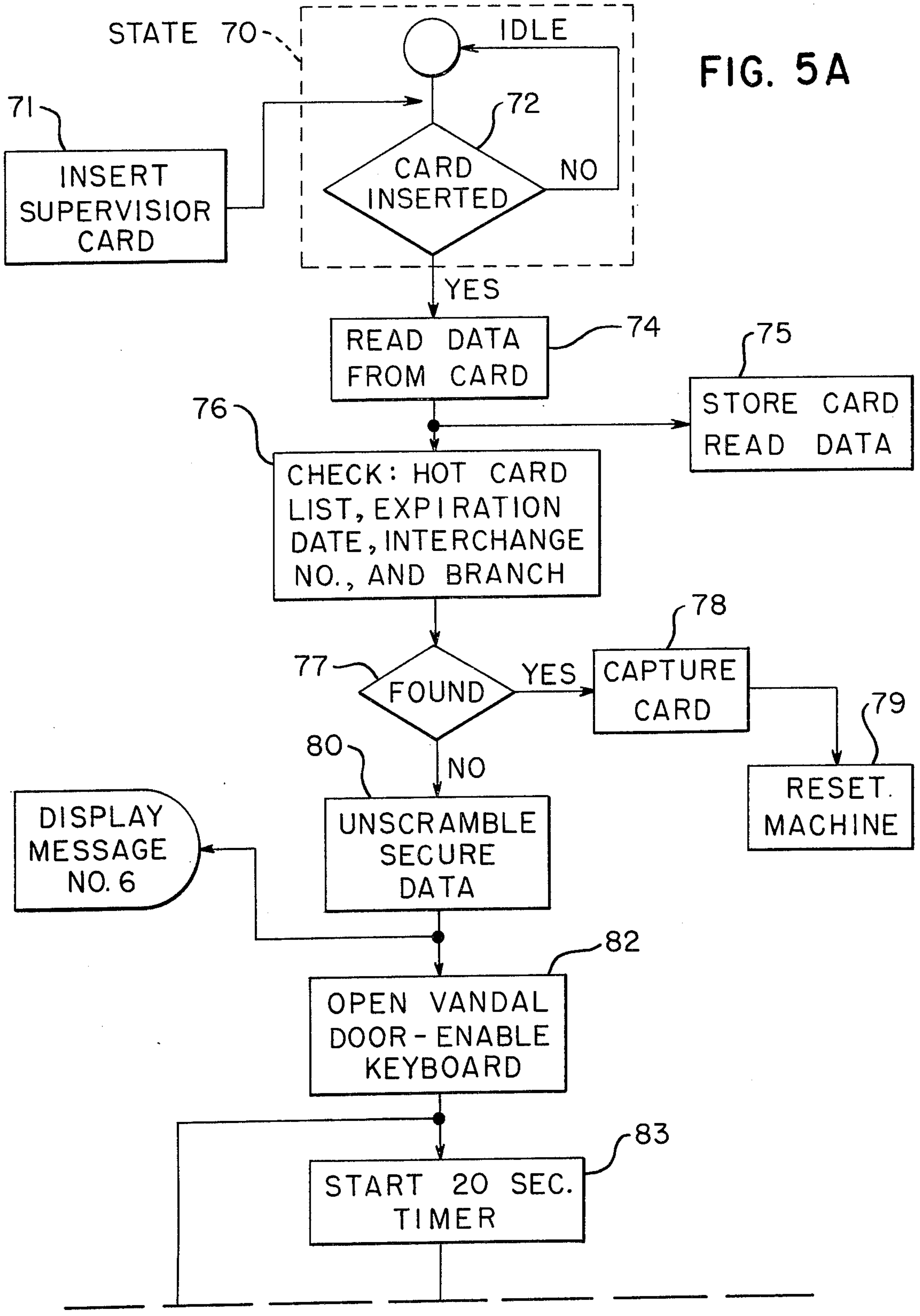
FIGS. 5A to 5E illustrate in flow diagram form the preferred invention.
Figure 5B:
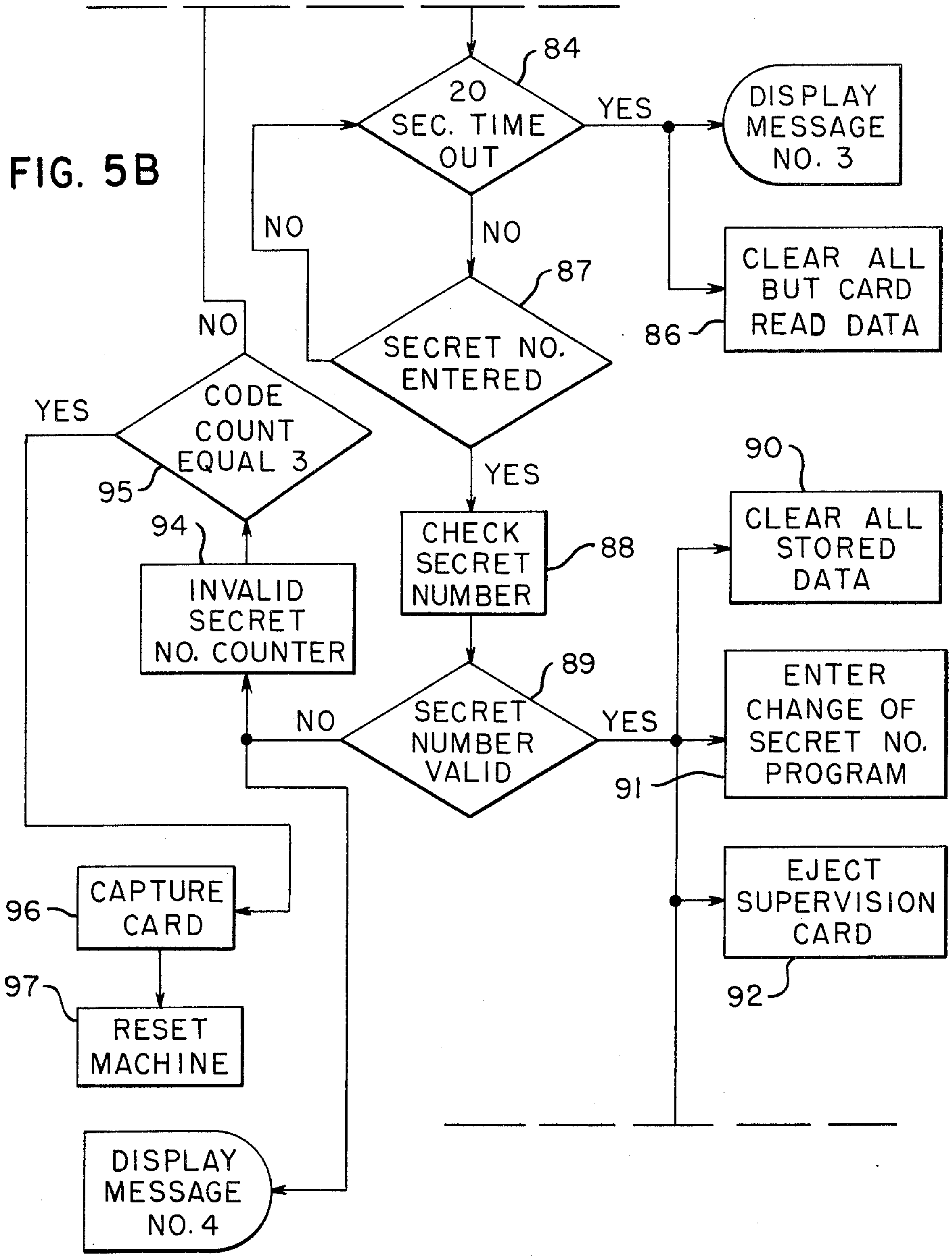
Figure 5C:
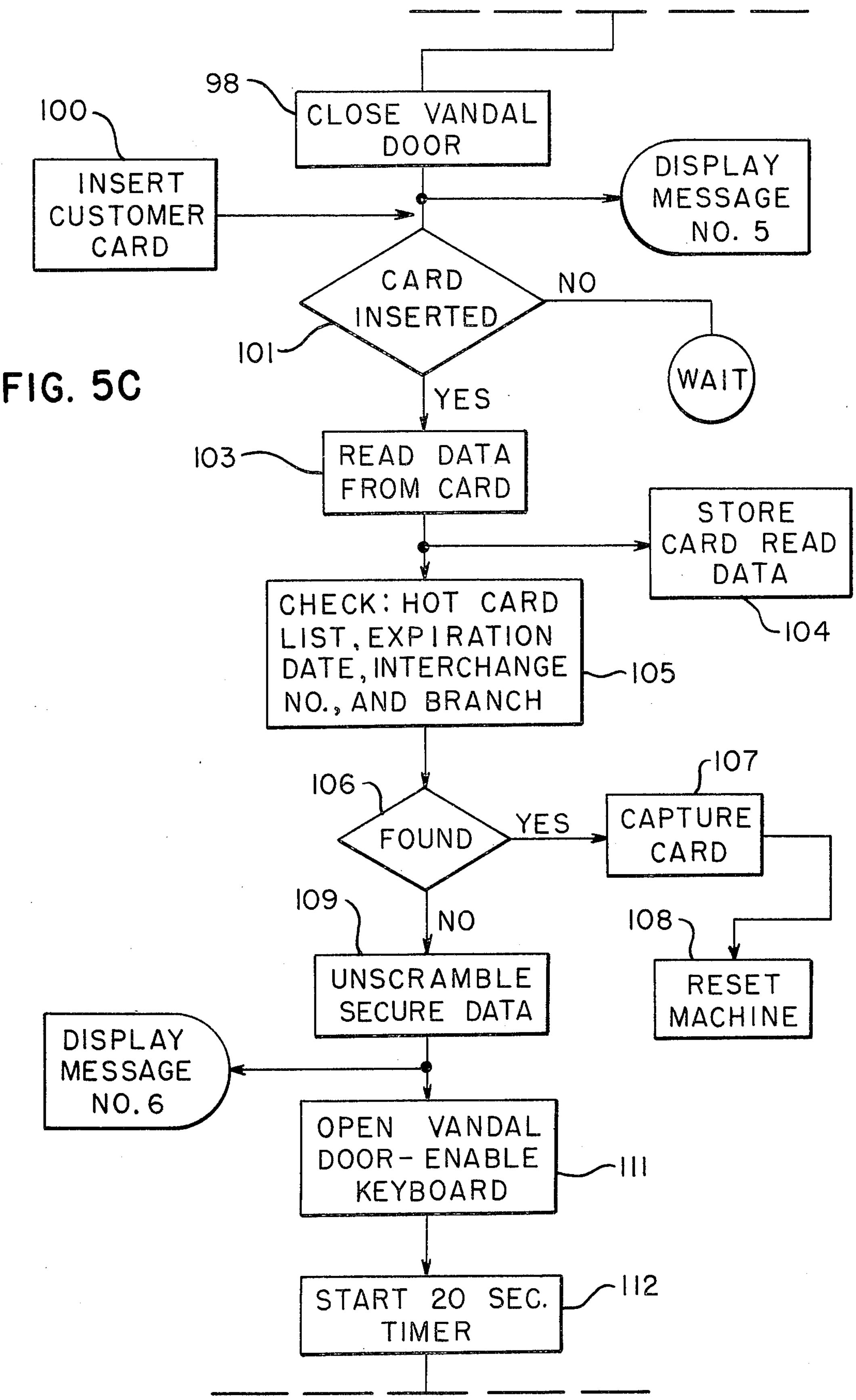
Figure 5D:
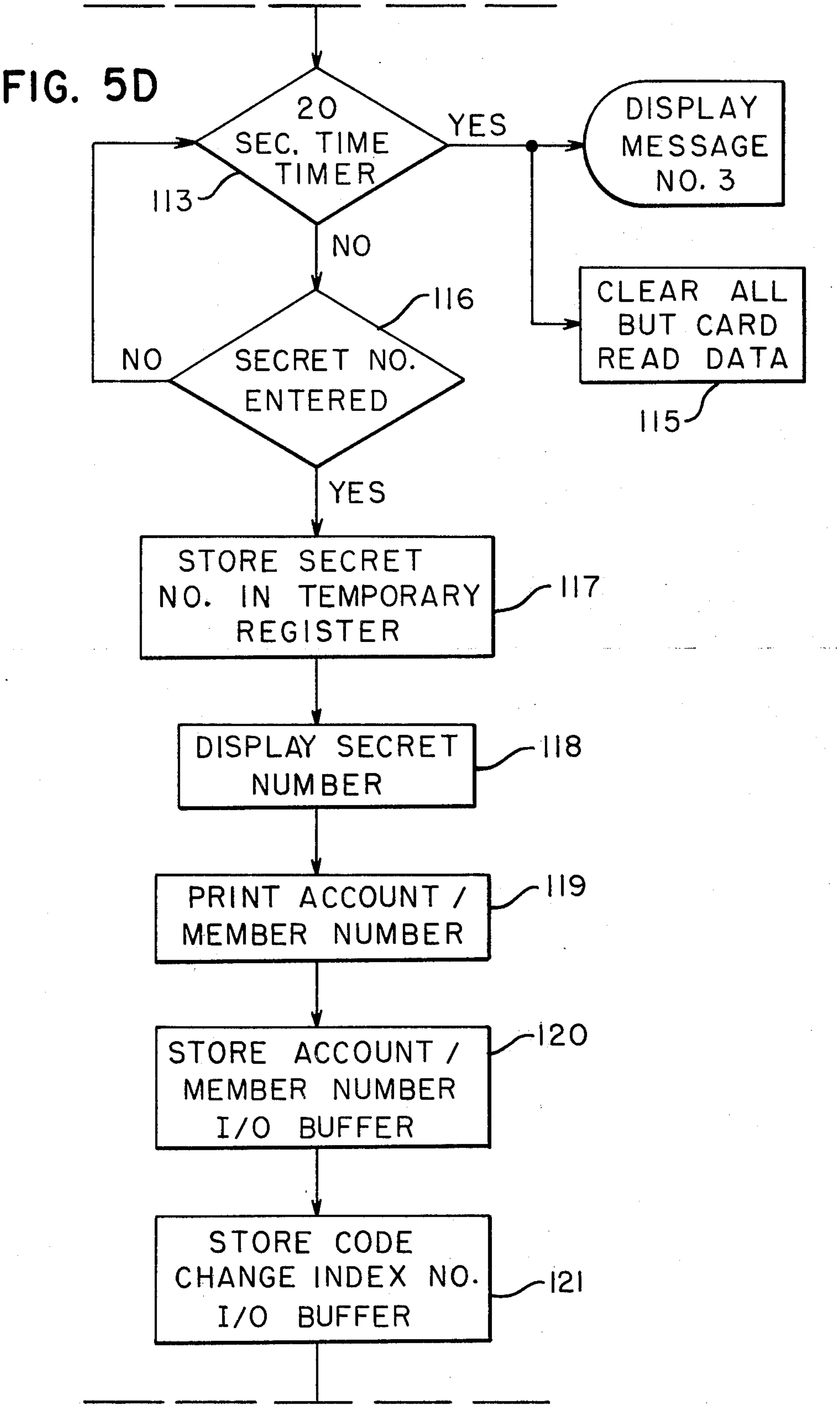
Figure 5E:
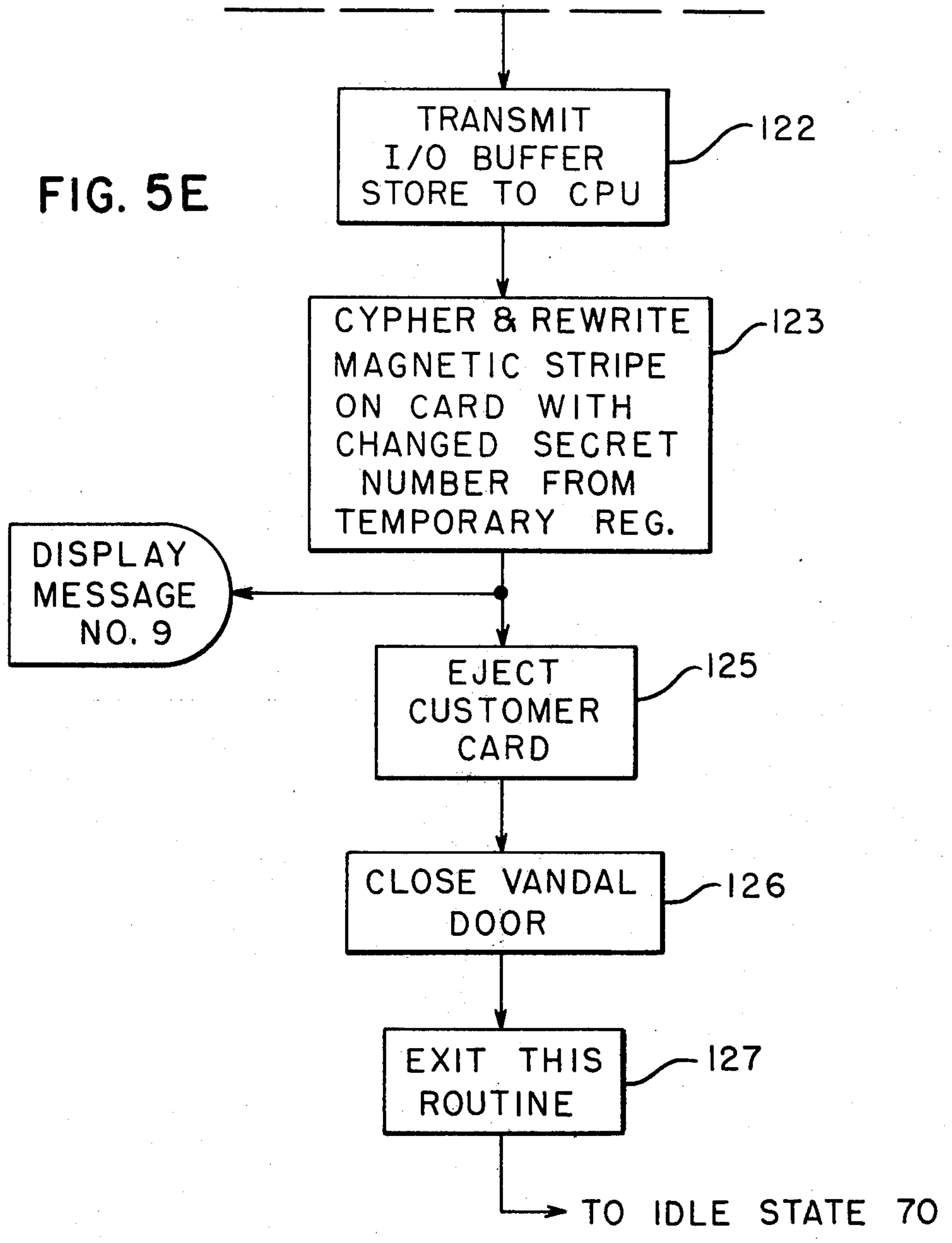

FIG. 4 illustrates in block diagram form the main operating blocks of a typical teller terminal machine. A terminal control unit (TCU) 50 provides the basic control functions for operation of the terminal. It controls and buffers data transferred between input-output units and performs the required arithmetic functions. Within the TCU are located a program memory, data registers, accumulator, input buffer, adder/subtractor and the associated control logic for instruction sequencing, decoding and data transfer. A more complete description of the TCU may be found in U.S. Pat. No. 3,702,988, to Ralph D. Haney et al., assigned to NCR Corporation.

Six Input/Output units are shown interfaced with the TCU; they are: a Magnetic Stripe Writer/Reader 22, a Lead Through Display and Keyboard unit 54, which is comprised of the lead through display 24 and keyboard 27 of FIG. 3, a Currency Dispenser 56, comprised, in part, of the revolving cash doors 29, a Journal Printer 59 for printing out transaction receipts, an Indicator and Control unit 58, comprised, in part, of the display 26, and a Data Entry Keyboard 57, comprised of the keyboard 25 and ERROR and ENTER keys 31 and 32, respectively. A Transaction Programmer 52 also interfaces with the TCU 50. The Transaction Programmer 52 is a non-volatile storage module which contains a read/write core memory, I/O data registers, totals, and the transaction program. The Transaction Programmer 52 is used for data storage as well as transaction program storage. Although one type of computer system is shown it will be obvious to persons skilled in the art that a general computer may be used to perform the functions of the TCU and Transaction Programmer.

Referring now to the flow chart of FIGS. 5A to 5E, the operating sequence of the preferred embodiment of the invention is shown therein. When the teller terminal machine 20 is turned on, the machine is maintained in an IDLE state 70 until a supervisor card 71 is inserted. Function 72 determines whether a card has been inserted or not. If a card has been entered the sequence is advanced to step 74 and the machine reads the data from the card. In the sequence at step 75 the read data is stored in, for example, a temporary register. The sequence is advanced to step 76 where file checks are then performed on the card. The file checks may include, for example, a check to determine if the card is a "hot card," whether the expiration date has passed, whether the card has the correct interchange number, and the correct branch number. More or fewer checks may be added by an individual user in order to insure that only an authorized valid card is being used in the machine. If for any reason the inserted card does not pass the check step then, the machine, through function 77, will capture the card, step 78, and in step 79, will reset the machine back to its IDLE state 70.

If the card passes the check step 76, the Secure Data read from the card is unscrambled by the machine in step 80. When the Secure Data is unscrambled the machine will display message No. 6 at display 24 and advance the sequence to step 83 wherein the vandal door, if present on the particular machine model, will be opened and the keyboard enabled. A 20 second timer is started in step 83. Inquiry 84 asks, whether 20 seconds has run out; if not, inquiry 87 asks if a secret number has been entered. If a secret number has not been entered and 20 seconds have run out the machine displays message number 3 and clears all but the card read data, of step 75. If inquiry 87 results in a "yes" answer then the machine checks the unscrambled secret number entered on the keyboard with the unscrambled secret number from the credit card, in step 88, to determine if they compare. If inquiry 89 is a "yes" then the supervisor card is ejected in step 92, a change of secret number program is entered (activated) by step 91 and all stored data is cleared by step 90. In addition, the vandal door is closed by step 98. If inquiry 89 results in a "no" then message No. 4 is displayed and an invalid secret number count of one is stored by step No. 94. When the number of invalid secret number entries reaches, for example, 3, the inquiry 95 will provide a "yes" response which response will cause the machine to advance to step 96 and capture the card. The machine will then advance to step 97 and be reset. When the machine is reset it will be placed back into the IDLE mode 70. Each time the inquiry 95 results in a "no" response the 20 second timer of step 83 is reset to zero. Although 3 tries are indicated by the program steps either more or less tries may be used depending on the user's requirements. The occurrence of step 98 in the sequence causes the message No. 5 to be positioned in the display window 24. Inquiry 101 is made to determine if a credit card has yet been inserted into the card slot 22. If the inquiry 101 results in a "no" response the machine "waits" until a card is inserted. The step 100, of inserting a credit card, activates a "yes" response to inquiry 101 which advances the sequence to step 103 wherein the data is read from the credit card.

The read data, from step 103, is stored in a temporary register within the machine in step 104. Simultaneously the machine performs step 105 wherein the card data is checked to determine if the card is on a "hot card" list; whether the expiration date has passed, and whether the interchange and branch numbers match. If inquiry 106 results in a "yes" response the sequence is advanced to step 107, wherein the card is captured. From step 107 the machine is advanced to step 108 of the sequence wherein the machine is RESET and returned to the IDLE state 70. If inquiry 106 results in a "no" response the sequence is advanced to step 109 and the Secure Data read from the card is unscrambled. Unscrambling of the Secure Data causes the sequence to advance to step 111 and to display message No. 6. Step 111 opens the vandal door if present and enables the keyboards. The sequence is then advanced to step No. 112, wherein the 20 sec. timer is activated. If the 20 sec. time out inquiry 113 results in a "yes" response the machine displays message No. 3 and the sequence is advanced to step 115, wherein all data but card read data is cleared. If inquiry 113 results in a "no" response the sequence advances to inquiry 116. A "no" response from inquiry 116 is fed back to inquiry 113. A "yes" response advances the sequence to step No. 117. In step 117 the secret number is stored in a temporary register and the sequence is advanced to step 118. In step 118 the machine displays the new secret number on the numerical display 26. The sequence is then advanced to step 119 wherein the account number read from the customer credit card is printed on a journal by the Journal Printer 59 of FIG. 3. The machine sequence is then advanced to step 120 wherein the account member number is stored in an I/O Buffer. The sequence advances to step 121 wherein a code corresponding to a secret number change is also stored in the I/O Buffer. The code, for example, may be the character 93. The sequence is then advanced to step 122 where the contents of the I/O Buffer are transferred to a central processing unit CPU for permanent storage if the machine is tied into a central computer or to the TCU if limited storage is available. The sequence then advances to step 123 to rewrite the ciphered new secret number from the temporary register on the credit card in the appropriate space in the Secure Data group. Message No. 9 is then displayed by the machine and sequence is then advanced to step No. 125 to eject the customer's card. The vandal door is closed in the sequence step 126 and the change of secret number routine is exited to storage in step 127. The machine is then returned to the IDLE state 70.

While there has been shown what is considered to be the preferred embodiment of the invention, it will be manifest that many modifications may be made therein without departing from the essential spirit of the invention. It is intended, therefore, in the annexed claims to cover all such changes and modificatons as may fall within the true scope of the invention.

What is claimed is:

1. The method of changing the coded secret number recorded on a credit card in a system including a data processing unit comprising the steps of:

a. transmitting an authorization code of said system authorizing a change in the secret number recorded on a credit card;
b. inserting the credit card into the system;
c. entering the desired secret number on the system machine keyboard;
d. erasing the old secret number from the credit card and recording the keyboard entered secret number on the credit card;
e. storing within said system data indicating a change of secret number; and
f. returning the credit card to the user.

2. The method of changing the coded secret number recorded on a credit card in a system including a central processing unit and a keyboard for entering data comprising the steps of:

a. inserting an authorizing credit card into the system to authorize the system to change secret numbers;
b. ejecting the authorizing credit card from the system;
c. inserting a user credit card into the system;
d. entering the desired secret number on the system keyboard;
e. erasing the old secret number for the credit card and recording the keyboard entered secret number on the credit card;
f. storing data indicative of a secret number change in the system; and
g. returning the credit card to the user.

3. The method according to claim 2 and further comprising the step of:

checking the validity of the authorizing credit card by comparing card read information data with system stored information data.

4. A method of changing the coded secret number recorded on a credit card, which method utilizes a program sequence in conjunction with a machine of the type that is activated by a credit card, the method comprising the steps of:

a. directing an authorization code to said machine authorizing a change in the secret number recorded on a credit card;
b. inserting a credit card into said machine;
c. entering the desired secret number of the machine keyboard;
d. erasing the old secret number from the credit card and recording the keyboard secret number on the credit card; and
e. returning the credit card to the user.

5. The method according to claim 4 and further comprising the step of:

verifying that the introduced credit card is a valid credit card.

6. The method according to claim 4 and further comprising the step of:

recording within said machine data indicating that a change in secret number has been made.

7. The method according to claim 4 and further comprising the step of:

visually displaying the entered secret number for purposes of accuracy verification.

8. The method of changing the secret number recorded on a credit card in an automatic system including a data processing unit comprising the steps of:

a. inserting a supervisor control card into said system, said control card having recorded thereon information data, authorizing change data, and a control secret number;
b. verifying that said control card is a valid control card utilizing said information data;
c. entering the control secret number on the system keyboard;
d. comparing the control secret number read from the control card with the control secret number entered on the system keyboard;
e. authorizing a change in secret number if a correspondence is found in the comparing step;
f. returning said supervisor control card;
g. inserting a user card into said system, said user card having recorded thereon, information data, and a secret number;
h. verifying that said user card is a valid user card utilizing said information data;

entering the user selected secret number on the system keyboard;

j. erasing the secret number recorded on said user card and recording the keyboard entered secret number on said user card;
k. recording data in said system indicating that a change in secret number has been made; and
l. returning said user card.

9. The method according to claim 8 and further comprising the step of:

limiting the time allowed for entering the control secret number on the system keyboard.

10. The method according to claim 8 and further comprising the steps of:

limiting the number of attempts for correctly entering the control secret number on the system keyboard.

11. The method according to claim 8 and further comprising the steps of:

visually displaying the user selected secret number entered on the system keyboard for verification.

12. The method according to claim 8 and further comprising the step of:

encoding the secret number recorded on said user card.

* * * * *

UNITED STATES PATENT OFFICE
CERTIFICATE OF CORRECTION

PATENT NO. : 3,996,450

DATED : December 7, 1976

INVENTOR(S) : Diane P. Kerkhoff

It is certified that error appears in the above-identified patent and that said Letters Patent are hereby corrected as shown below:

Column 6, line 34, delete "of" and substitute --to--.
Column 6, line 57, delete "for" and substitute --from--.
Column 7, line 10, delete "of" and substitute --on--.
Column 8, line 25, delete "steps" and substitute --step--.
Column 8, line 30, delete "steps" and substitute --step--.

Signed and Sealed this

Tenth Day of May 1977

[SEAL]

*Attest:*

RUTH C. MASON
*Attesting Officer*

C. MARSHALL DANN
*Commissioner of Patents and Trademarks*